US010502582B2

(12) United States Patent
Yamashita et al.

(10) Patent No.: US 10,502,582 B2
(45) Date of Patent: *Dec. 10, 2019

(54) MODIFYING MAP CONFIGURATIONS BASED ON ESTABLISHED LOCATION POINTS

(71) Applicant: Uber Technologies, Inc., San Francisco, CA (US)

(72) Inventors: Yuhki Yamashita, San Francisco, CA (US); Didier Patrick Hilhorst, San Francisco, CA (US); Bryant Jow, San Francisco, CA (US); Peter Ng, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/697,828

(22) Filed: Sep. 7, 2017

(65) Prior Publication Data

US 2018/0087918 A1    Mar. 29, 2018

Related U.S. Application Data

(63) Continuation of application No. 15/395,885, filed on Dec. 30, 2016, now Pat. No. 9,791,291.

(Continued)

(51) Int. Cl.
*G01C 21/36* (2006.01)
*G08G 1/00* (2006.01)
(Continued)

(52) U.S. Cl.
CPC ....... *G01C 21/367* (2013.01); *G01C 21/3438* (2013.01); *G01C 21/3655* (2013.01);
(Continued)

(58) Field of Classification Search
CPC ............ G01C 21/3438; G01C 21/3655; G01C 21/367; G08G 1/202; G06Q 10/06311; G06Q 50/30; G09B 29/007
See application file for complete search history.

(56) References Cited

U.S. PATENT DOCUMENTS 5,450,343 A * 9/1995 Yurimoto ............. G01C 21/367
340/990
5,699,255 A * 12/1997 Ellis ..................... G01C 21/367
340/995.12

(Continued)

FOREIGN PATENT DOCUMENTS

JP      2004028898 A  *  1/2004
JP      2009-146300         7/2009

(Continued)

OTHER PUBLICATIONS

Google translation of JP 2004-28898 (original JP document published Jan. 29, 2004) (Year: 2004).*

(Continued)

*Primary Examiner* — Behrang Badii
*Assistant Examiner* — David A Testardi
(74) *Attorney, Agent, or Firm* — Mahamedi IP Law LLP

(57) ABSTRACT

A computer system can monitor a dynamic location of a transport service provider traveling to rendezvous with a requesting user at a start location. The computer system can generate map content to be displayed on a user interface a computing device of the requesting user. The computer system may then generate a toggle feature on the user interface to enable the requesting user to switch between a plurality of map configurations for the map content. Each of the plurality of map configurations can define a dynamic zoom level of the map content and being based on a plurality of toggle points comprising a plurality of (i) the dynamic (Continued)

location of the transport service provider, (ii) the dynamic location of the requesting user, or (iii) the start location.

16 Claims, 8 Drawing Sheets

Related U.S. Application Data

(60) Provisional application No. 62/399,633, filed on Sep. 26, 2016.

(51) Int. Cl.
| | |
|---|---|
| *G06Q 50/30* | (2012.01) |
| *H04W 4/02* | (2018.01) |
| *H04L 12/24* | (2006.01) |
| *G01C 21/34* | (2006.01) |
| *H04W 4/60* | (2018.01) |
| *G06Q 10/08* | (2012.01) |
| *H04W 4/029* | (2018.01) |
| *H04W 88/06* | (2009.01) |

(52) U.S. Cl.
CPC ......... *G06Q 10/0833* (2013.01); *G06Q 50/30* (2013.01); *G08G 1/202* (2013.01); *H04L 41/22* (2013.01); *H04W 4/023* (2013.01); *H04W 4/029* (2018.02); *H04W 4/60* (2018.02); *H04W 88/06* (2013.01)

(56) References Cited

U.S. PATENT DOCUMENTS

| | | | |
|---|---|---|---|
| 6,173,445 B1 | 1/2001 | Robins | |
| 6,396,475 B1* | 5/2002 | Ellenby | G01C 21/3682 345/156 |
| 6,424,910 B1 | 7/2002 | Ohler | |
| 6,574,551 B1 | 6/2003 | Maxwell | |
| 6,697,734 B1* | 2/2004 | Suomela | G01C 21/367 340/995.1 |
| 7,945,566 B2 | 5/2011 | James | |
| 8,311,875 B1 | 11/2012 | Lloyd | |
| 8,738,292 B1* | 5/2014 | Faaborg | G01C 21/26 701/117 |
| 8,761,797 B1* | 6/2014 | Norton | H04W 4/023 455/456.1 |
| 8,989,773 B2 | 3/2015 | Sandel | |
| 9,485,647 B2 | 11/2016 | Mohebbi | |
| 9,613,386 B1* | 4/2017 | Arden | G06Q 50/30 |
| 9,756,139 B2* | 9/2017 | Memon | H04L 67/20 |
| 9,791,291 B1* | 10/2017 | Yamashita | G01C 21/367 |
| 2002/0138338 A1 | 9/2002 | Trauth | |
| 2003/0184594 A1* | 10/2003 | Ellenby | G01C 21/20 715/810 |
| 2006/0056023 A1 | 3/2006 | Malfait | |
| 2006/0116965 A1 | 6/2006 | Kudo | |
| 2006/0227047 A1* | 10/2006 | Rosenberg | G01S 5/0054 342/357.55 |
| 2007/0233373 A1* | 10/2007 | Choi | G01C 21/367 701/533 |
| 2008/0134088 A1 | 6/2008 | Tse | |
| 2008/0288763 A1 | 11/2008 | Reik | |
| 2009/0063464 A1 | 3/2009 | Chang | |
| 2009/0111422 A1 | 4/2009 | Bremer | |
| 2009/0216600 A1 | 8/2009 | Hill | |
| 2009/0248587 A1 | 10/2009 | Van Buskirk | |
| 2010/0153279 A1 | 6/2010 | Zahn | |
| 2010/0241349 A1 | 9/2010 | Wu | |
| 2011/0053552 A1 | 3/2011 | Kim | |
| 2011/0099040 A1 | 4/2011 | Felt | |
| 2011/0113148 A1* | 5/2011 | Salmela | G01C 21/3438 709/229 |
| 2011/0307282 A1 | 12/2011 | Camp | |
| 2012/0032974 A1 | 2/2012 | Lynch | |
| 2012/0046862 A1* | 2/2012 | Griffin | G01C 21/20 701/521 |
| 2012/0050307 A1 | 3/2012 | Mahowald | |
| 2012/0089974 A1 | 4/2012 | Cho | |
| 2012/0149312 A1 | 6/2012 | Velusamy | |
| 2012/0150436 A1 | 6/2012 | Rossano | |
| 2012/0232791 A1 | 9/2012 | Sterkel | |
| 2012/0289203 A1 | 11/2012 | Santo | |
| 2012/0323627 A1 | 12/2012 | Herring, Jr. | |
| 2013/0072308 A1 | 3/2013 | Peck | |
| 2013/0132140 A1* | 5/2013 | Amin | G06Q 10/02 705/7.13 |
| 2013/0185152 A1 | 7/2013 | Aaron | |
| 2013/0246301 A1 | 9/2013 | Radhakrishnan | |
| 2013/0282602 A1 | 10/2013 | Wang | |
| 2013/0290110 A1 | 10/2013 | LuVogt | |
| 2013/0325319 A1 | 12/2013 | Moore | |
| 2013/0345980 A1 | 12/2013 | van Os | |
| 2014/0026065 A1 | 1/2014 | Wang | |
| 2014/0039792 A1 | 2/2014 | Seetharam | |
| 2014/0040079 A1 | 2/2014 | Smirin | |
| 2014/0113660 A1* | 4/2014 | Park | H04W 4/025 455/456.3 |
| 2014/0188615 A1 | 7/2014 | Badenhop | |
| 2014/0194148 A1* | 7/2014 | Griffin | G01C 21/32 455/456.3 |
| 2014/0215330 A1 | 7/2014 | Lee | |
| 2014/0297178 A1 | 10/2014 | Luan | |
| 2014/0309806 A1 | 10/2014 | Ricci | |
| 2014/0378118 A1 | 12/2014 | Mohebbi | |
| 2015/0149320 A1* | 5/2015 | Smirin | G06Q 20/14 705/26.8 |
| 2015/0205465 A1 | 7/2015 | Robison | |
| 2015/0241239 A1 | 8/2015 | van Dok | |
| 2015/0276421 A1 | 10/2015 | Beaurepaire | |
| 2015/0279216 A1* | 10/2015 | Ghanma | G08G 1/202 705/7.15 |
| 2016/0018230 A1 | 1/2016 | Neubecker | |
| 2016/0021154 A1* | 1/2016 | Schoeffler | G06Q 10/10 709/204 |
| 2016/0073223 A1 | 3/2016 | Woolsey | |
| 2016/0073227 A1 | 3/2016 | Han | |
| 2016/0082581 A1 | 3/2016 | Lai | |
| 2016/0265932 A1* | 9/2016 | Blumenberg | G01C 21/3614 |
| 2016/0307288 A1* | 10/2016 | Yehuda | G06F 16/29 |
| 2016/0356615 A1 | 12/2016 | Arata | |
| 2016/0358471 A1 | 12/2016 | Hajj | |
| 2017/0265040 A1* | 9/2017 | Friedlander | H04W 4/029 |
| 2017/0358113 A1 | 12/2017 | Bray | |
| 2018/0067620 A1* | 3/2018 | Adler | G06F 3/0482 |
| 2018/0218463 A1 | 8/2018 | Jobling | |
| 2018/0227704 A1* | 8/2018 | Itoh | G08G 1/005 |

FOREIGN PATENT DOCUMENTS

| | | |
|---|---|---|
| WO | WO 2013-134863 | 9/2013 |
| WO | WO 2014-000141 | 1/2014 |
| WO | WO 2014-074407 | 5/2014 |
| WO | WO 2015-089207 | 6/2015 |

OTHER PUBLICATIONS

Computerworld article, "Need a ride? 3 Ridesharing and 2 taxi apps considered", Jan. 9, 2015, 17 pages, downloaded from http://www.computerworld.com/article/2863379/need-a-ride-3-ridesharing-an-d-2-taxi-apps-considered.html (Year: 2015).*

ApproachMe Google Play app web page, Updated May 27, 2016, 5 pages, downloaded on Mar. 25, 2017 from: https://play.google.com/store/apps/details?id=conn.approachme.approachme&h-l=en (Year: 2016).*

International Search Report in PCT/US2017/053536 dated Dec. 15, 2017.

International Search Report in PCT/US2017/053491 dated Jan. 4, 2018.

International Search Report in PCT/US2016/043017 dated Oct. 27, 2016.

(56) References Cited

OTHER PUBLICATIONS

Computerworld article, "Need a ride? 3 Ridesharing and 2 taxi apps considered", Jan. 9, 2015, 17 pages, downloaded from http://www.computerworld.com/article/2863379/need-a-ride-3-ridesharing-and-2-taxi-apps-considered.html.
ApproachMe Google Play app web page, Updated May 27, 2016, 5 pages, downloaded from: https://play.google.com/store/apps/details?id=com.approachme.approachme&hl=en.
EESR in EP 16828425.5 dated Feb. 28, 2019.

* cited by examiner

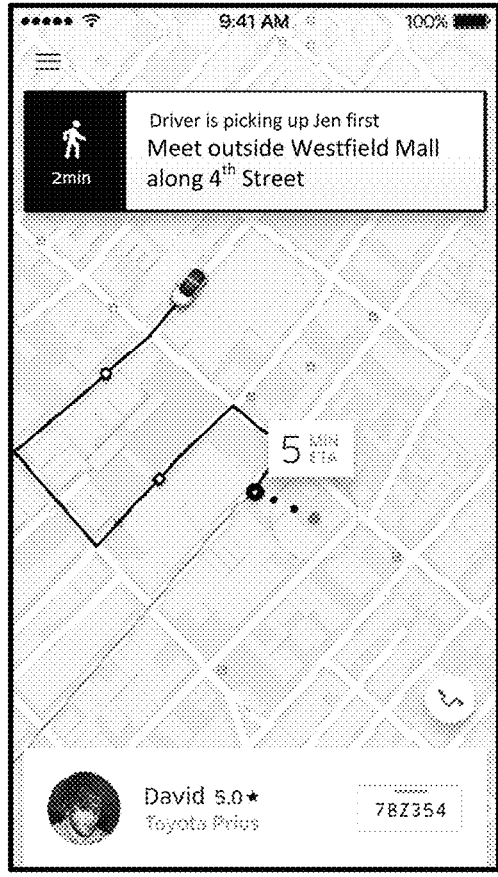
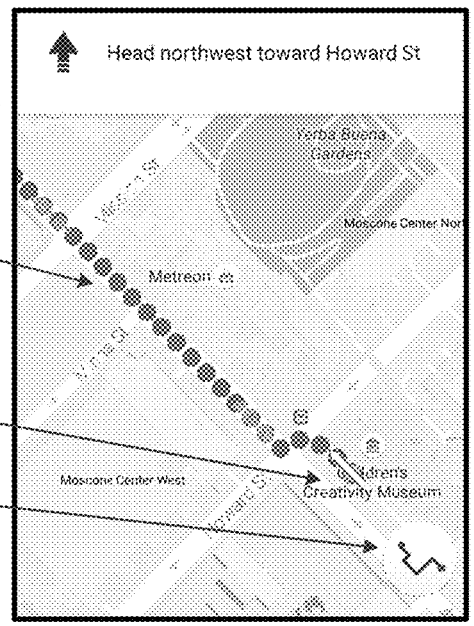
FIG. 4A
FIG. 4B

FIG. 4C
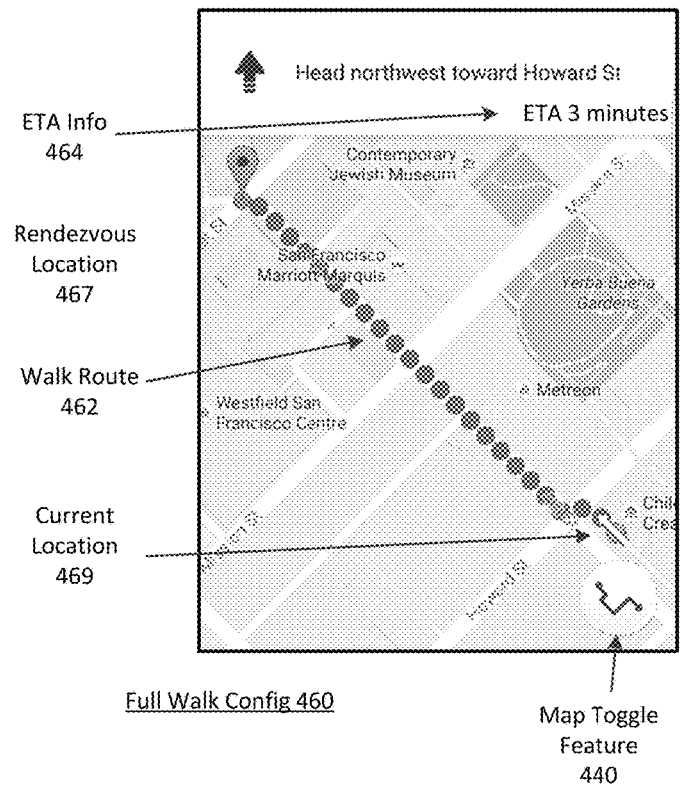
ETA Info 464
Rendezvous Location 467
Walk Route 462
Current Location 469
Full Walk Config 460
Map Toggle Feature 440
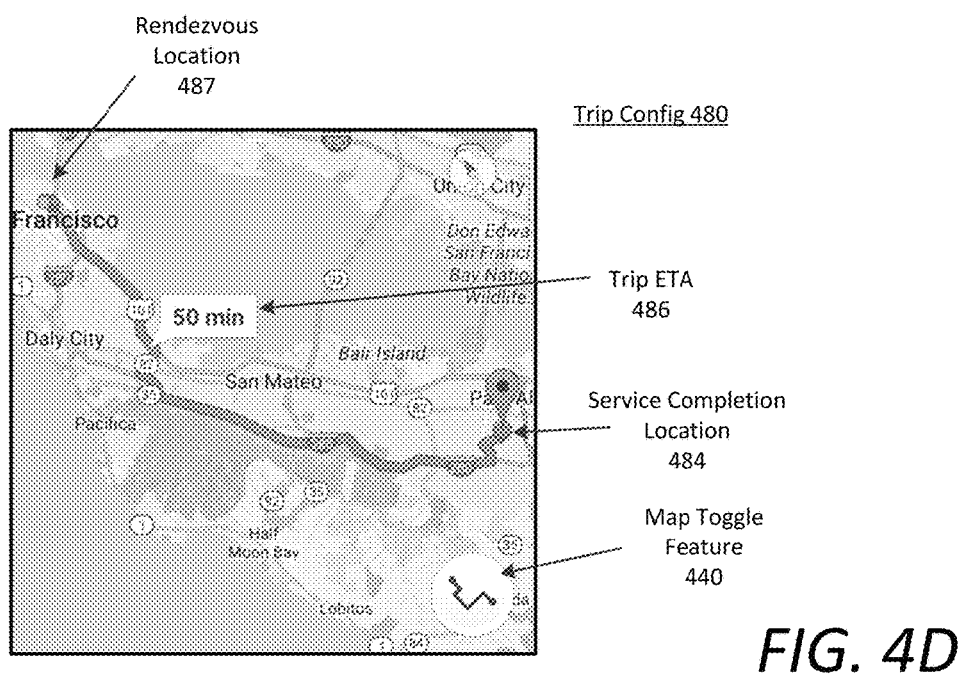
Rendezvous Location 487
Trip Config 480
Trip ETA 486
Service Completion Location 484
Map Toggle Feature 440
FIG. 4D

MODIFYING MAP CONFIGURATIONS BASED ON ESTABLISHED LOCATION POINTS

CROSS REFERENCE TO RELATED APPLICATION

This application is a continuation of U.S. patent application Ser. No. 15/395,885, entitled "Modifying Map Configurations based on Established Location Points," which claims the benefit of U.S. Provisional Application No. 62/399,633, filed Sep. 26, 2016; the aforementioned applications being hereby incorporated by reference in their respective entireties.

BACKGROUND

User centric services typically sequence users through a number of selection interfaces so that the user can specify certain information for a desired type of service, including service-level selections and preferences. With enhancements in network and mobile technology, the number of on-demand services for user selection is also increasing, creating inconvenience for human operators. Moreover, the time needed for selection can occupy an interface device, creating performance issues and draining resources of the operative selection device.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 4A, 4B, 4C, and 4D illustrate example user interfaces on a computing device of a requester that includes a zoom toggle feature, according to examples described herein;

DETAILED DESCRIPTION

Figure 1:
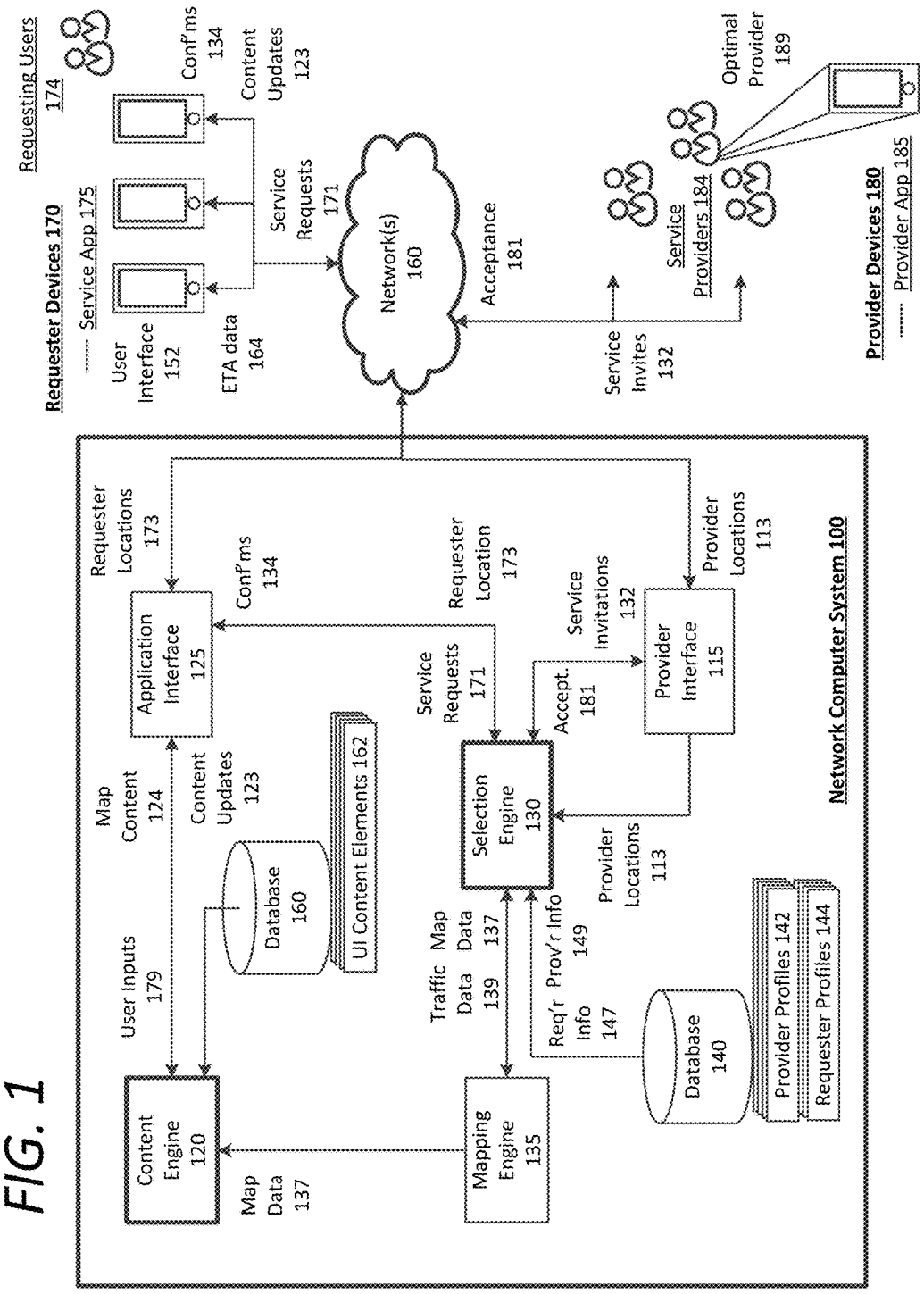
FIG. 1 is a block diagram illustrating an example network computer system in communication with computing devices of service requesters and service providers, in accordance with examples described herein.

A network computer system is described herein that manages an on-demand network-based service linking available service providers with requesting users throughout a given region (e.g., a metroplex such as the San Francisco Bay Area). In doing so, the network computer system can receive service requests for the on-demand service (e.g., a transport service or delivery service) from requesting users (e.g., a rider) via a designated service application executing on the computing devices of the requesting users. Based on a determined rendezvous location or inputted location(s) (e.g., a pick-up location and/or destination location), the network computer system can identify a number of proximate available service provider and transmit a service invitation to one or more computing devices of the proximate available service provider to fulfill the service request. In many examples, the service provider can either accept or decline the invitation based on, for example, the requested service being impractical for the service provider.

In determining an optimal service provider to fulfill a given service request, the transport system can identify a plurality of candidate drivers to service the service request based on a rendezvous location indicated in the service request. As provided herein, an "optimal" service provider corresponds to a service provider, from a candidate set of service providers that has been determined to be most suitable to fulfilling or completing a particular service request based on one or more factors. The factor(s) can comprise the service provider being closest to the rendezvous location, having a lowest estimated time of arrival (ETA) to the rendezvous location, an estimated collective value generated by the service provider in being selected as compared to other service providers, and other factors. In some aspects, the transport system can identify a set of candidate service providers (e.g., twenty or thirty service providers within a certain proximity of the rendezvous location), and select a most optimal service provider from the candidate service providers to service the service request based on any of the above factors. In the context of on-demand transportation services, a service provider can comprise a driver selected to rendezvous with the requesting user at the rendezvous location (or pick-up location), and transport the requesting user to a service completion location (or destination).

According to examples provided herein, a computing system is provided that causes a user interface specific to the service application to be generated on a display screen of a requesting user's computing device. As described herein, the computing system can comprise a backend datacenter or server system (e.g., comprising the network computer system) that hosts the on-demand network-based service. Additionally or alternatively, one or more processes described in connection with the computing system may be performed processing resources of the requesting user's mobile computing device via execution of the service application. Thus, the processes described herein can be wholly or partially executed by either the network computer system or the requesting user's computing device executing the service application.

In certain implementations, the computing device can transmit, over one or more networks, a service request to the backend network computer system. In some aspects, the service request can include at least a rendezvous location and/or a service completion location (e.g., a destination of the requesting user). Based on the rendezvous location, the network computer system can select and invite an optimal service provider to service the service request, and transmit a confirmation to the requesting user's computing device indicating that the selected service provider is en route to the rendezvous location to rendezvous with the requesting user. In certain implementations, the requesting user's computing device can generate map content on the user interface. The map content can indicate at least the rendezvous location and a dynamic location point of the service provider while the service provider is en route (or traveling) to the rendezvous location. According to many aspects, the requesting user's computing device may then dynamically zoom and center the map content based on the rendezvous location and the dynamic location point of the service provider.

In certain implementations, the service application can provide a selectable toggle feature on the user interface to enable the user to switch or toggle between a plurality of map views or configurations having zoom levels and/or center points based on locations associated with the service request. In some examples, the plurality of zoom levels or map configurations can correspond to a plurality of toggle location points (e.g., pairs of location points) that determine the map configuration. Accordingly, the start or rendezvous location, destination location, the requesting user's current location, and/or the service provider's location can each be established as toggle location points for the map configurations. In one aspect, the requesting user's current location and the rendezvous location can be paired as a first map configuration. Since the rendezvous location is a static rendezvous point, and the requesting user's current location is dynamic as the requesting user proceeds towards the rendezvous location, the requesting user's computing device can dynamically update a zoom level of the first map configuration as the requesting user proceeds towards the rendezvous location. In other words, as the requesting user proceeds towards the rendezvous location, the map content can be dynamically zoomed (e.g., zoomed in) on the requesting user's computing device based on the location points of the rendezvous location and the requesting user's current location converging.

In additional implementations, a second map configuration can include the rendezvous location, and the service provider's dynamic location while en route to the rendezvous location as configuration points (e.g., for configuring a zoom level of the map content). Additionally or alternatively, the second map configuration can include the service provider's dynamic location and the requesting user's dynamic location as configuration points as both the service provider and requesting user proceed to the rendezvous location. For such a map configuration, the map content can be dynamically zoomed and updated based on the locations of both the requesting user and the service provider converging on the rendezvous location. It is contemplated that any combination of the service provider's location, requesting user's location, rendezvous location, and destination can comprise configuration points for different map configurations. Accordingly, once such locations are known, the requesting user's computing device and/or the network computer system can establish configurations points between the known locations in order to establish certain parameters of the map configurations. For example, a pair of locations can determine a center position and initial zoom level of a particular map configuration, and the zoom level can be dynamically adjusted based on the relative locations changing (e.g., a service provider proceeding to a rendezvous location). As another example, a single location (e.g., the requesting user's current location) can determine a centering and zoom level another map configuration, and the map content can be dynamically scrolled as the single location changes.

In one example, successive user selections of the toggle feature on the user interface of the service application can cause the map content be toggle between the different map configurations. For example, each successive input on the toggle feature can cause the service application to sequentially zoom and re-center the map content through each of the established map configurations according to individual location points or location point pairs. In variations, the toggle feature can enable the requesting user to select a particular map configuration based on any of the location points or established location pairings. For example, the toggle feature can enable the requesting user to toggle between a walk map configuration and an "en route" map configuration. As provided herein, the walk map configuration can be established using the requesting user's current location and the rendezvous location, and the en route zoom level can be established using the service provider's current location and the rendezvous location or the requesting user's current location. In response to user inputs on the toggle feature, the service application can toggle through each of the map configurations accordingly.

Among other benefits, the examples described herein achieve a technical effect of providing requesting users of an on-demand network-based service (e.g., an on-demand transportation service) with increased control over map content to aid in rendezvousing with a service provider. By enabling customized zoom toggling between multiple location points and map configurations in connection with on-demand transportation, the requesting user can be provided with information that aids in facilitating on-demand services. Furthermore, not only can the requesting user view details of the service provider's progression to the rendezvous location, the requesting user may also be provided with detailed walking directions and an estimated walking time to the rendezvous location.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices.

Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). AVs or SDVs refer to vehicles that operate or can be operated in a state of automation with respect to steering, propulsion, and/or braking. Some vehicles may include human-based controls (e.g., a steering wheel, gear shifter, brake pedal, and accelerator pedal), and can be switch between a fully autonomous mode, partial autonomous mode, and/or manual control mode. In fully autonomous mode, AVs or SDVs can operate on public roads without any human assistance utilizing a sensor suite and data processing systems to provide an awareness of the AV's or SDV's situational environment. In processing sensor data from the sensor suite—which can comprise a number of sensor systems such as LIDAR, monocular camera, stereoscopic camera, infrared proximity-based, sonar, or radar systems—the AV or SDV can operate its control mechanisms to safely control and maneuver through various road and traffic infrastructures typical of both urban and rural transportation environments.

System Description

FIG. 1 is a block diagram illustrating an example network computer system in communication with computing device of requesting users and service providers, in accordance with examples described herein. The network computer system 100 can manage an on-demand network-based service (e.g., an on-demand transportation service) that connects requesting users 174 with service providers 184 that are available to fulfill the requesting users' 174 service requests 171. In on example, the on-demand network-based service can provide an on-demand transportation platform that enables ride sharing services between requesting users 174 and available service providers 184 (e.g., available drivers) by way of a service application 175 executing on the requesting users' computing devices 170 (or "requester devices 170"), and a service provider application 185 executing on the service provider devices 180. As used herein, a requester device 170 and a service provider device 180 can comprise computing devices with functionality to execute a designated application corresponding to the on-demand network-based service managed by the network computer system 100. In many examples, the requester device 170 and the service provider device 180 can comprise mobile computing devices, such as smartphones, tablet computers, VR or AR headsets, on-board computing systems of vehicles, personal computers, laptops, wearable computing devices, and the like.

The network computer system 100 can include an application interface 125 to communicate with requester devices 170 over one or more networks 160 via a service application 175. According to examples, a requesting user 174 wishing to utilize the on-demand service can launch the service application 175 and transmit a service request 171 over the network 160 to the network computer system 100. For an example on-demand transport service, the requesting user 174 can view multiple different service options managed by the network computer system 100, such as a ride-pooling service, a standard ride share service, a luxury vehicle service, a van or large vehicle service, a professional driver service (e.g., where the driver is certified), a self-driving vehicle transport service, and the like. In some examples, the network computer system 100 can utilize the service provider locations 113 to provide the requester devices 170 with ETA data 164 of proximate service providers for each respective service option. For example, the service application 175 can enable the requesting user 174 to scroll through each service option. In response to a soft selection of a particular service option, the network computer system 100 can provide ETA data 164 on a user interface of the service app 175 that indicates an ETA of the closest service provider for the selected (or soft-selected) service option, and/or the locations of all proximate available service provider for that selected service option. As the requesting user 174 scrolls through each service option, the user interface 152 can update to show visual representations of service providers 184 for that service option on a map centered on the requesting user 174 or a rendezvous location set by the requesting user 174. The requesting user 174 can interact with the user interface 152 of the service app 175 to select a particular service option and transmit a service request 171 to the network computer system 100.

In some examples, the service request 171 can include a rendezvous location within a given region (e.g., a metropolitan area managed by one or more datacenters corresponding to the network computer system 100) in which a matched service provider is to rendezvous with the requesting user 174. The rendezvous location can be inputted by the requesting user 174 by setting a location pin on a user interface 152 of the service app 175, or can be determined by a current location 173 of the requesting user 174 (e.g., utilizing location-based resources of the requester device 170). Additionally, the requesting user 174 can further input a service completion location during or after submitting the service request 171.

In various implementations, the network computer system 100 can further include a selection engine 130 to process the service requests 171 in order to ultimately select from a pool of service providers 184 operating throughout the given region to fulfill or complete the service requests 171. The network computer system 100 can include a service provider interface 115 to communicate with the service provider devices 180 via the service provider application 185. In accordance with various examples, the service provider devices 180 can transmit their current locations 113 using location-based resources of the service provider devices 180 (e.g., GPS resources). These service provider locations 113 can be utilized by the selection engine 130 to identify a set of candidate service providers 184, in relation to the rendezvous location, that are available to fulfill the service request 171.

In certain examples, the network computer system 100 can also select a proximate self-driving vehicle (SDV) to service the service request 171. Thus, the pool of proximate candidate service providers 184 in relation to a rendezvous location can also include one or more SDVs operating throughout the given region.

In some aspects, the network computer system 100 can include a mapping engine 135, or can utilize a third-party mapping service, to generate map data 137 and or traffic data 139 in the environment surrounding the rendezvous location indicated in the service request 171. The selection engine 130 can utilize the current locations 113 of the service providers 184, the map data 137, and/or the traffic data 139 in order to select an optimal service provider 189 to fulfill or completer the service request 171. As provided herein, the optimal service provider 189 can be a service provider that is closest to the requesting user 174 or the rendezvous location with respect to distance or time, or can be a proximate service provider that is optimal for other reasons, such as the service provider's experience, the amount of time the service provider has been on the clock, the service provider's current earnings, and the like.

Once the optimal service provider 189 is selected, the selection engine 130 can generate a service invitation 132 to fulfill the service request 171, and transmit the service invitation 132 to the optimal service provider 189 via the service provider application 185 executing on the optimal service provider's computing device 180. Upon receiving the service invitation 132, the optimal service provider 189 can either accept or reject the invitation 132. Rejection of the invitation 132 can cause the selection engine 130 to determine another optimal service provider from the candidate set of service providers 184 to fulfill the service request 171, or can cause the selection engine 130 to determine a new set of candidate service providers from which to select another service provider. If the optimal service provider 189 accepts (e.g., via an acceptance input), then the acceptance input 181 can be transmitted back to the selection engine 130, which can generate and transmit a confirmation 134 of the optimal service provider 189 to the requesting user 174 via the service application 175 executing on the requesting user's 174 computing device 170.

In accordance with some examples, the network computer system 100 can include a database 140 storing requester profiles 144 and service provider profiles 144. The database can be accessible by the selection engine 130 in matching a candidate service provider with a requesting user 174. For example, the requesting user 174 can preconfigure the requester profile 144 with certain preferences (e.g., preferred service option) and requirements (e.g., disability assistance), and can provide ratings for service providers 184 that have provided on-demand services to the requesting user 174. In some examples, other information can be provided by the requesting user 174, such as comments and complaints, which can be utilized by the network computer system 100 in maintaining and updating the requesting user's 174 requester profile 144. Historical data corresponding to the requesting user's 174 utilization of the on-demand service can also be analyzed to independently determine certain inclinations or preferences of the requesting user 174. For example, the historical data can indicate a rate of usage (e.g., once per week), common service completion locations (e.g., destinations) and rendezvous locations, and favored service options (e.g., carpooling or luxury vehicle transport options). The selection engine 130 can utilize the requester information 147 in the requester profile 144 of the requesting user 174 upon receiving a service request 171, in order to determine an optimal service provider 189 from the candidate set of service providers 184.

The selection engine 130 can further utilize service provider information 149 from the service provider profiles 142 in order to determine an optimal service provider 189 to fulfill a particular service request 171. In some examples, the service provider profile 142 for a particular service provider can include identifying information, such as vehicle information (e.g., vehicle model, year, license plate number, and color), the service provider's overall rating, qualified service options (e.g., professional service provider, certified assistance service provider, etc.), experience, earnings, and the like. In variations, the service provider profile 142 can further include the service provider's preferences, such as preferred service areas, routes, hours of operation, and the like. In response to a service request 171, the selection engine 130 can initially filter service providers 184 based on the requested service option by the requesting user 174 to identify a set of candidate service providers 184 to service the service request 171. In certain implementations, the selection engine 130 can further filter the candidate set of service providers 184 by utilizing the service provider information 149 for each of the candidate set of service providers 184, as well as the current locations, distances from the rendezvous location, and/or respective ETAs to the rendezvous location. Based on the service provider information 149 for each candidate service provider 184, their respective locations and/or ETAs, the requester information 147 in the rider profile 144, and service provider information 149 in the service provider profiles 142, the selection engine 130 can determine an optimal service provider 189 from the candidate set of service providers 184, and transmit a service invitation 132 to that service provider 189 to fulfill the service request 171.

According to examples provided herein, the network computer system 100 can include a content engine 120 that manages the manner in which content is displayed on the requester devices 170 and/or the service provider devices 180. Regarding the requester devices 170, the content engine 120 can provide content updates 123 based on user inputs 179 on the user interface 152 generated by the service application 175. For example, a user selection on a content feature of the service app 175 can cause the content engine 120 to generate a new screen on the service app 175, or cause a current screen to pivot between certain displayed features. In many examples, the content engine 120 can access a database 160 that includes user interface elements 162 to provide content updates 123 to the requester devices 170 in response to the user inputs 179. The user interface elements 162 can comprise any number of screens with any number of selectable features, displayed information, input boxes, and/or spatial elements that can provide third party content from third party applications (e.g., news content, social media content, etc.). Furthermore, the user interface elements 162 can include preconfigured features that enable the requester device 170 to enhance user experience.

In some examples, the content engine 120 can receive the requester location 173 of a requesting user 174 and input the requester location 173 onto map data 137 from the mapping engine 135. The map data 137 can further include service provider locations 113 of available service providers proximate to the requesting user 174. The content engine 120 can provide map content 124 to the requester device 170 of the user 174 via the service application 175. In generating the map content 124, the content engine 120 can include virtual representations of proximate available service providers that can be filtered based on service option, as described herein. As further described herein, the map content 124 can be displayed on the user interface 152 to include information corresponding to a requested service, such as ETA data 164 for the optimal service provider 189 to arrive at the rendezvous location, an estimated walk time for the requesting user 174 between a current location and the rendezvous location, and a total estimated completion time for the on-demand service.

According to examples described herein, once the rendezvous location is known and the service request 171 is received from a requester device 170, the content engine 120 can utilize the locations of the optimal service provider 189, the requesting user 174, the rendezvous location, and the destination to provide a map toggle feature for the map content 124. The map toggle feature can enable the requesting user 174 to selectively view the map content 124 in a plurality of different configurations and in a number of dynamic and/or static zoom levels. Examples described herein recognize that a zoom level for map content 124 can be established with at least two known location points or can be preconfigured based on a single location point. Accordingly, the content engine 120 can establish location point pairs or sets of two or more location points on the map content 124 as zoom toggle points defining different map configurations having specified zoom levels and centering locations that the requesting user 174 can toggle through using the map toggle feature on the user interface 152.

In various implementations, once a requesting user 174 has submitted a service request 171, the rendezvous location may require the requesting user 174 to walk a certain distance in order to rendezvous with the optimal service provider 189. For example, certain rendezvous location areas may be mandated by local rules, such as rendezvous locations at airports, concert and sporting venues, train and bus stations, and other common public areas. In response to receive a service request 171 with an inputted rendezvous location, the selection engine 130 may suggest that the requesting user 174 walk to a predetermined pick-up area to rendezvous with the service provider 189. In variations, the selection engine 130 may suggest an alternative rendezvous location to the requesting user 174 that would optimize time for both the requesting user 174 and the service provider 189. In the foregoing examples, the content engine 120 can establish a dynamic "walk" map configuration using the requesting user's 174 current location 173 and the rendezvous location. Additionally, the content engine 120 can provide a walking route on the map content 124 when the walk configuration is selected or toggled by the requesting user 174. The walking route and/or a walk zoom level can be dynamically updated as the requesting user 174 proceeds to the rendezvous location. In certain implementations, the content engine 120 can determine when the requesting user 174 is within a predetermined distance to the rendezvous location (e.g., ten meters), and terminate the dynamic nature of the walk zoom level accordingly. For example, the content engine 120 can replace the dynamic walk zoom level with a static zoom level of the map content 124 including both the requesting user's current location 173 and the rendezvous location indicated in the service request 171.

In some examples, the map content 124 can enable the requesting user 174 to toggle between a full walk mapping configuration that provides the total distance and route to the rendezvous location, and a local walk mapping configuration that provides more granularity and detail in the directions to the rendezvous location. For example, selection of the local walk zoom level can cause the map to reconfigure a view angle (e.g., a street view angle) to provide the user with more detailed, real-time directions and route information on a step by step basis. Thus, the zoom toggle feature can further reconfigure the view angle of the map content (e.g., from an overhead view to a street view), and can also re-center the map content based on one or more established location points in the map content.

In addition to the walk zoom level, the content engine 120 can utilize the current location of the optimal service provider 189 and the rendezvous location (or the user's current location) to establish an "en route" mapping configuration with a zoom level that dynamically updates as the service provider 189 proceeds to the rendezvous location. In one example, the content engine 120 can terminate the dynamic nature of an en route zoom level once the service provider 189 approaches within a predetermined distance of the rendezvous location (e.g., thirty meters). For such examples, the requesting user 174 can utilize the toggle feature on the user interface 152 to toggle between the walk mapping configuration—to more readily reference walking directions to the rendezvous location—and the en route mapping configuration in order to be informed of the service provider's progress to the rendezvous location. Additionally or alternatively, the content engine 120 can establish a dynamic zoom level utilizing the current location of the requesting user 174 and the current location of the service provider 189 as they both converge towards the rendezvous location. In further implementations, the content engine 120 can establish a total trip zoom level based on the current location 173 of the requesting user 174 and the service completing location (e.g., a destination).

As provided herein, the requesting user 174 can utilize the toggle feature on the user interface 152 to toggle through such mapping configurations and zoom levels based on established location points described herein. Examples described herein recognize that user confusion regarding the predetermined locations of certain pick-up areas can substantially impact user experience. Thus, the toggle feature on the map content 124 seeks to enable the requesting user 174 to readily identify the rendezvous location on the map content 124 and, in certain implementations, be provided with an optimal walking route and ETA information to the rendezvous location in the walk mapping configuration. Such features of the walk zoom level can negate any confusion by the requesting user 174 in rendezvousing with the service provider 189, and can further provide valuable timing information between the requesting user's 174 ETA to the rendezvous location versus the service provider's 189 ETA.

Requester Device

Figure 2:
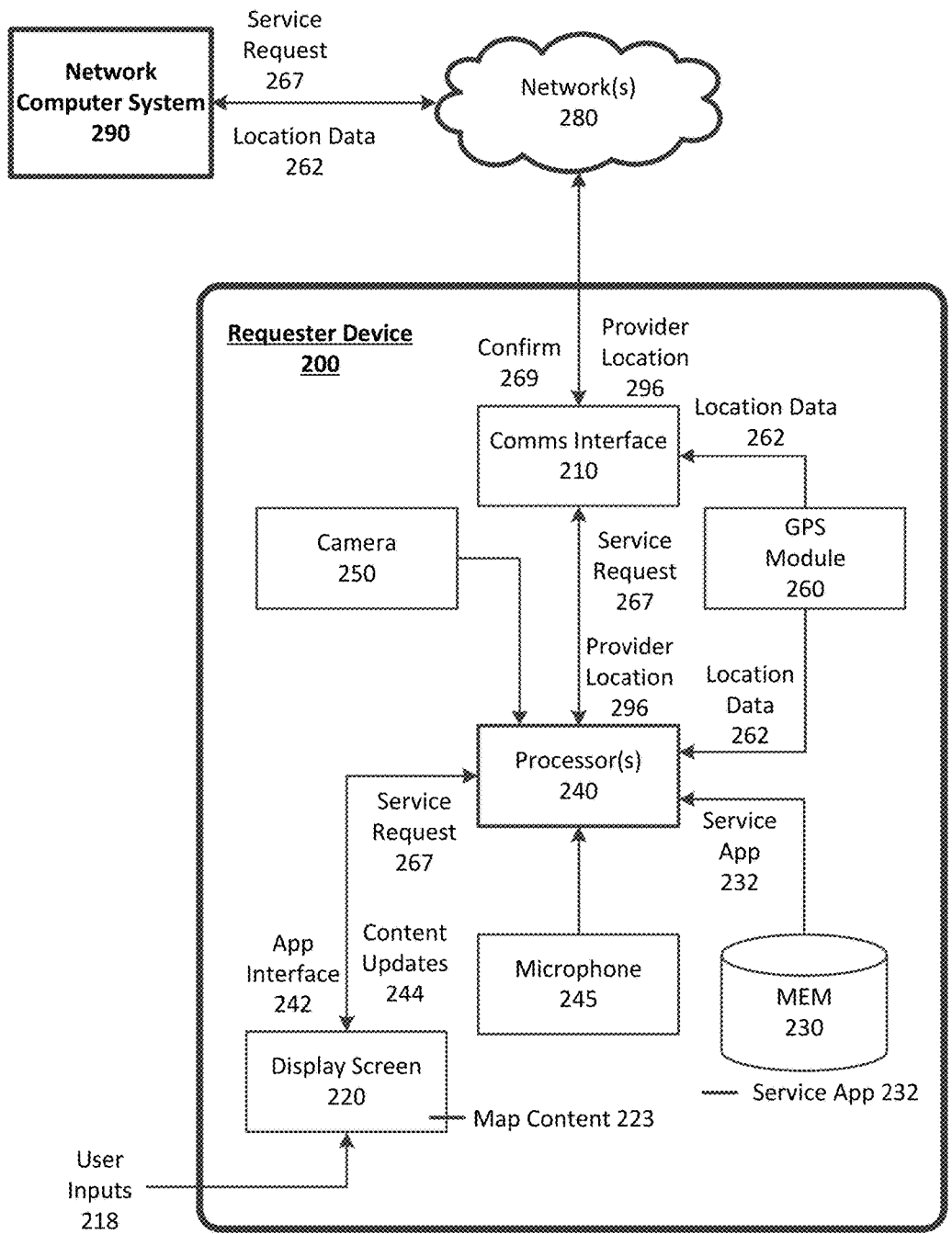
FIG. 2 is a block diagram illustrating an example computing device of a requester executing a designated service application for a network-based on-demand service, as described herein.

FIG. 2 is a block diagram illustrating an example requester device executing a designated service application for an on-demand network-based service, as described herein. In many implementations, the requester device 200 can comprise a mobile computing device, such as a smartphone, tablet computer, laptop computer, VR or AR headset device, and the like. As such, the requester device 200 can include typical telephony features such as a microphone 245, a camera 250, and a communication interface 210 to communicate with external entities using any type of wireless communication protocol. In certain aspects, the requester device 200 can store a designated application (e.g., a service app 232) in a local memory 230.

In response to a user input 218, the service app 232 can be executed by one or more processors 240, which can cause an app interface 242 to be generated on a display screen 220 of the requester device 200. The app interface 242 can enable the requesting user to, for example, check current price levels and availability for the on-demand service. In various implementations, the app interface 242 can further enable the requesting user to select from multiple service options. In the context of an on-demand transport service, these service options can include a carpooling service, a regular ride-sharing service, a professional ride service, a van transport service, a luxurious ride service, and the like.

The requesting user can generate a service request 267 via user inputs 218 provided on the app interface 242. For example, the requesting user can select a rendezvous location, view the various service options and estimated or upfront pricing, and select a particular service option to be completed at a service completion location (e.g., for transportation to an inputted destination). In many examples, the requesting user can input the service completion location (e.g., the destination) prior to rendezvousing with the service provider. As provided herein, the service application 232 can further enable a communication link with a network computer system 290 over the network 280, such as the network computer system 100 as shown and described with respect to FIG. 1.

The processor(s) 240 can transmit the service requests 267 via a communications interface 210 to the backend network computer system 290 over a network 280. In response, the requester device 200 can receive a confirmation 269 from the network computer system 290 indicating the selected service provider and vehicle that will fulfill the service request 267 and rendezvous with the requesting user at the rendezvous location. In various examples, the requester device 200 can further include a GPS module 260, which can provide location data 262 indicating the current location of the requesting user to the network computer system 290 to, for example, establish the rendezvous location (or start location) and/or select an optimal service provider or autonomous vehicle to fulfill the service request 267.

According to examples, execution of the service application 232 can cause map content 223 to be generated on the display screen 220. As described herein, the map content 223 can include a zoom toggle feature that enables the requesting user to toggle between multiple established zoom levels based on the rendezvous location, the destination, the current location of the service provider, and the current location of the requesting user. In many aspects, the map content 223 can be interactive, enabling the requesting user to manually select locations, zoom, rotate, and scroll the map content 223 by way of traditional user gestures (e.g., pinch, scroll, tap, and twist gestures). As described, the map content 223 can also be preconfigured with established dynamic zoom levels based on the dynamic locations of the requesting user and the service provider.

In certain aspects, sequential inputs 218 on the toggle feature can cause the map content 223 to toggle or otherwise be modified between the preconfigured zoom levels and map configurations. As provided herein, a critical time for the utilization of the zoom toggle feature is when both the service provider and the requesting user are en route to the rendezvous location. In executing the service application 232, the processor(s) 240 can further execute each zoom level of the map content 223, at least between the walk map configuration so that the requesting user can readily proceed to the rendezvous location, and the en route map configuration so that the requesting user can view the service provider's progress to the rendezvous location. As further provided herein, the service application 232 can further provide ETA data of the service provider as well as ETA data for the requesting user on the app interface 242 as they both respectively proceed to the rendezvous location. Accordingly, in some aspects, the requester device 200 can receive the service provider location 296 of the service provider selected to service the service request 267. The processor(s) 240 can then input the service provider location 296 onto the map content 223 via the service application 232, which can establish the zoom levels accordingly to enable the zoom toggle feature on the app interface 242.

As provided herein, one or more processes described in connection with the network computer system 100 of FIG. 1 can be performed by the processor(s) 240 of the requester device 200 executing the service application 232. For example, certain content updates 244 for the app interface 242 can be generated by the processor(s) 240 as opposed to the content engine 120 as shown and described with respect to FIG. 1. In one example, some or all of the configuration and toggling processes (e.g., based on location point data received from the network computer system 100) may be performed by the requester device 200 executing the service application 232. For example, one or more steps described with respect to FIGS. 5 and/or 6 may be performed by the requester device 200 as opposed to the network computer system 100. Accordingly, the content updates 244 corresponding to the toggling map configurations and zoom levels can be performed by the processor(s) 240 of the requester device 200 via execution of the service application 232. In certain aspects, the requester device 200 can do so by detecting the current location of the requester device 200 and receiving location data 296 of a service provider in order to establish the location points for dynamic zooming and map toggling. For example, the requester device 200 can periodically receiving location data 296 of the service provider from the network computer system 290 and the service application 232 can render the map tiles and the different map configurations accordingly.

User Interface Examples

Figures 3A, 3B:
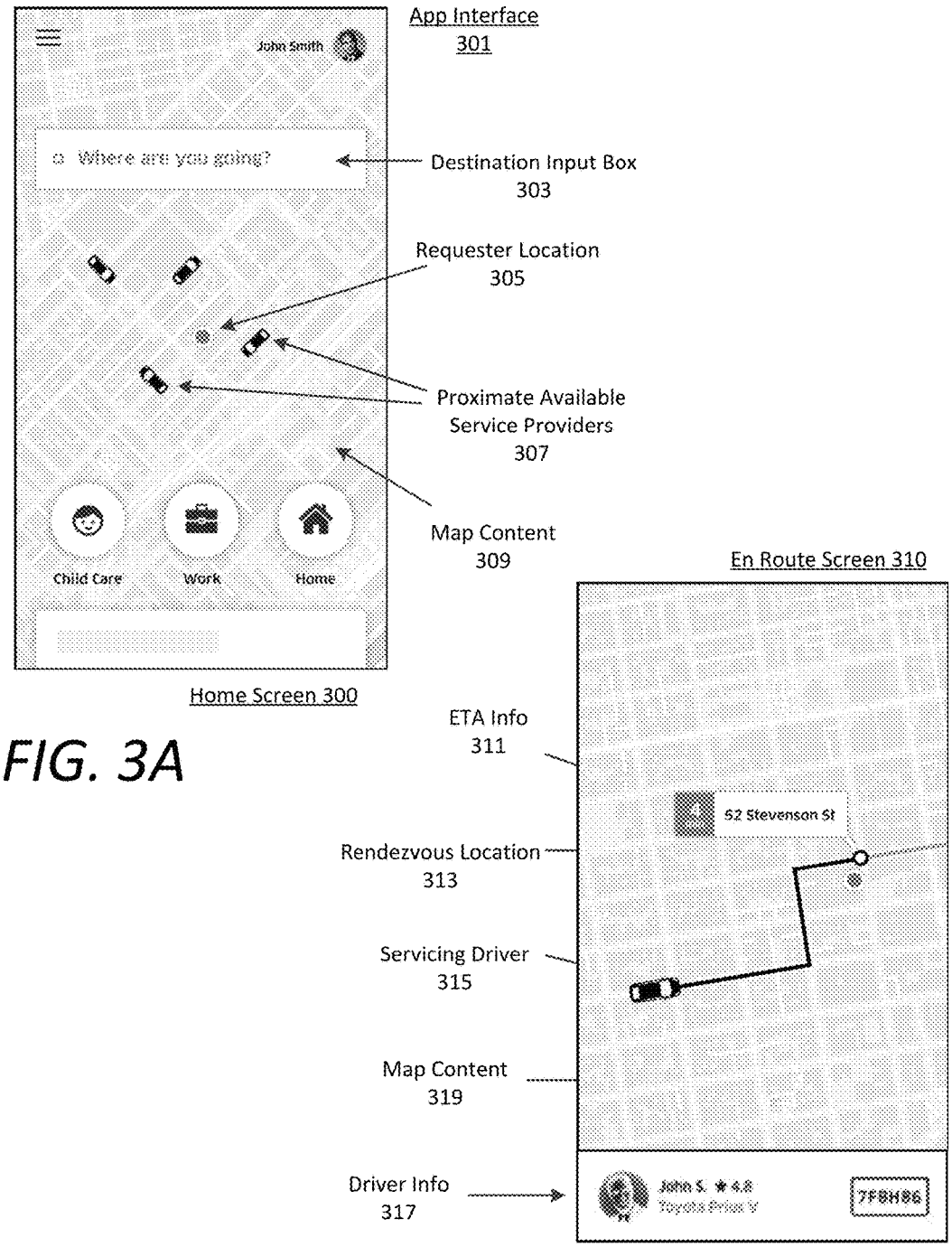
FIGS. 3A and 3B illustrate example user interfaces on a computing device of a requester, according to examples described herein.

FIGS. 3A and 3B illustrate example user interfaces on a requester device, according to examples described herein. In the below description of FIGS. 3A and 3B, reference may be made to reference characters representing like features as shown and described with respect to FIG. 2. Referring to FIG. 3A, execution of the service application 232 on the requester device 200 can cause an app interface 301 to be generated on the display screen 220. In some aspects, the app interface 301 can comprise an initial home screen 300, and can feature such elements as a destination input box 303 (e.g., a service completion location), a location feature 305 indicating the requesting user's current location, and virtual representations of proximate available service providers 307 (e.g., drivers). In some aspects, the features of the home screen 300 can overlay or be included with map content 309 of the surrounding area of the requesting user.

FIG. 3B illustrates an "en route" screen 310 generated once a service request has been submitted and a servicing service provider 315 has been selected. In certain aspects, the en route screen 310 can be generated as a subsequent screen in response to a service provider being selected to fulfill a service request. The en route screen 310 can include a rendezvous location 313 as well as the requesting user's current location, and estimated time of arrival information 311 for the selected service provider 315. In many aspects, the en route screen 310 can further include service provider information 317 such as the selected service provider's 315 name, vehicle type, and license plate number. Furthermore, the various features of the en route screen can also overlay or be included with map content 319.

FIGS. 4A and 4B illustrate example user interfaces on a requester device that includes a map toggle feature, according to examples described herein. Upon receiving a confirmation that a service provider is en route, the service application can generate map configuration toggle screens 400 and a map toggle feature 440 to enable the requesting user to toggle between each toggle screen. In certain implementations, a default toggle screen can be initially displayed, and can include a map toggle feature 440 which the requesting user can sequentially select to zoom and/or center the map content 409 to other established mapping configurations. The default toggle screen can comprise map content 409 at any of the established zoom levels based on known location points as described herein. In one example, the default screen comprises the en route configuration 402 encompassing the requesting user's current location, the service provider's current location, and respective routes for each. In other examples, the default toggle screen comprises a local walk configuration 445 that includes the requesting user's current location and a walk route 444, as shown in FIG. 4B. In still other examples, the default screen can comprise a full walk configuration 460 or a trip configuration 480, as shown in FIGS. 4C and 4D respectively.

Referring to FIG. 4A, the en route configuration 402 can include various features overlaying map content 409. In various examples, the en route configuration 402 can include walking instructions and an ETA 408 associated with the requesting user walking to the rendezvous location 407. The en route configuration 402 can further include a walk route 412 for the requesting user, and a service provider route 404 indicating the service provider's path on the map content 409 to the rendezvous location 407. In some aspects, the en route configuration 402 can further include a service provider ETA 406 and service provider information 418 to enable the requesting user to readily identify the service provider's vehicle as the service provider approaches the rendezvous location 407. As provided herein, the en route configuration 402 can also include a map toggle feature 440, which the requesting user can select to toggle between zoom levels and map configurations.

Referring to FIG. 4B, a user selection of the map toggle feature 440 can cause a local walk configuration 425 to be generated on the display of the requester device. The local walk configuration 425 can include a localized walk route 424 to provide the requesting user with detailed directions to the rendezvous location. As such, the local walk configuration 425 can include the requesting user's current location 422, and can dynamically update or scroll as the requesting user progresses towards the rendezvous location. In certain implementations, the local walk zoom screen 425 can implement a single persistent zoom and can be centered based on the current location of the user 422. The local walk configuration 425 can also include the map toggle feature 440, which the requesting user can select to cause another contextual map configuration to be generated.

FIG. 4C shows a full walk configuration 460 indicating the total walking route 462 from the requesting user's current location 469 to the rendezvous location. In some aspects, the full walk configuration 460 can include ETA information 464 indicating an estimated time for the requesting user to walk to the rendezvous location 467. The full walk configuration 460 can be based on the rendezvous location 467 and the current location of the requesting user 469, and can be dynamically updated or zoomed as the requesting user proceeds towards the rendezvous location 467. The full walk configuration 460 can also include the map toggle feature 440, which is selectable to cause another mapping configuration to be generated.

FIG. 4D shows a trip configuration 480 based on the rendezvous location 487 and the destination 484. As shown in FIG. 4D, the trip configuration 480 can include a current trip ETA 486 for the trip. According to examples described herein, the trip configuration 480 can comprise a default configuration after the service provider has picked up the user at the rendezvous location 487. Alternatively, a local trip status screen (not shown) can become the default screen, and can include detailed information of route progress towards the service completion location 484, much like the local walk configuration 425 shown in FIG. 4B.

In some examples, once a particular mapping configuration becomes redundant or obsolete, the requester device can automatically terminate that configuration from the sequenced set of toggle screens. For example, referring to FIG. 4C, once the requesting user has reached the rendezvous location 467, the requester device can terminate the full walk configuration 460 from the sequential set of toggle screens. This can leave a local configuration (e.g., replacing the local walk configuration 425), the en route configuration 402, and the total trip configuration 480 as toggle screens activated by the map toggle feature 440. As another aspect, once the service provider has picked up the requesting user, the requester device can terminate the en route configuration 402 from the sequential set. Accordingly, while the service provider and requesting user are on-trip between the rendezvous location and destination 484, the service application can either terminate the map toggle feature 440, or configure the map toggle feature 440 to switch between a full trip configuration 480 and a local trip configuration (not shown)—where the local trip zoom screen can show more granular directions and details of the travel route.

Furthermore, while on-trip, the service application on the requester device can enable various additional functions and features, such as news and entertainment features, third party application windows, communication links to other users or smart devices (e.g., smart home devices), and the like. In one example, such content can be generated to overlay the user interface of the service application (e.g., such as in a scrollable tray or window). In certain variations, the requesting user can readily access the map content 409 indicating the trip progress to the destination by, for example, selecting a persistent map feature (e.g., an icon), or scrolling or swiping the additional features off the screen using a swiping gesture.

Methodology

Figure 5:
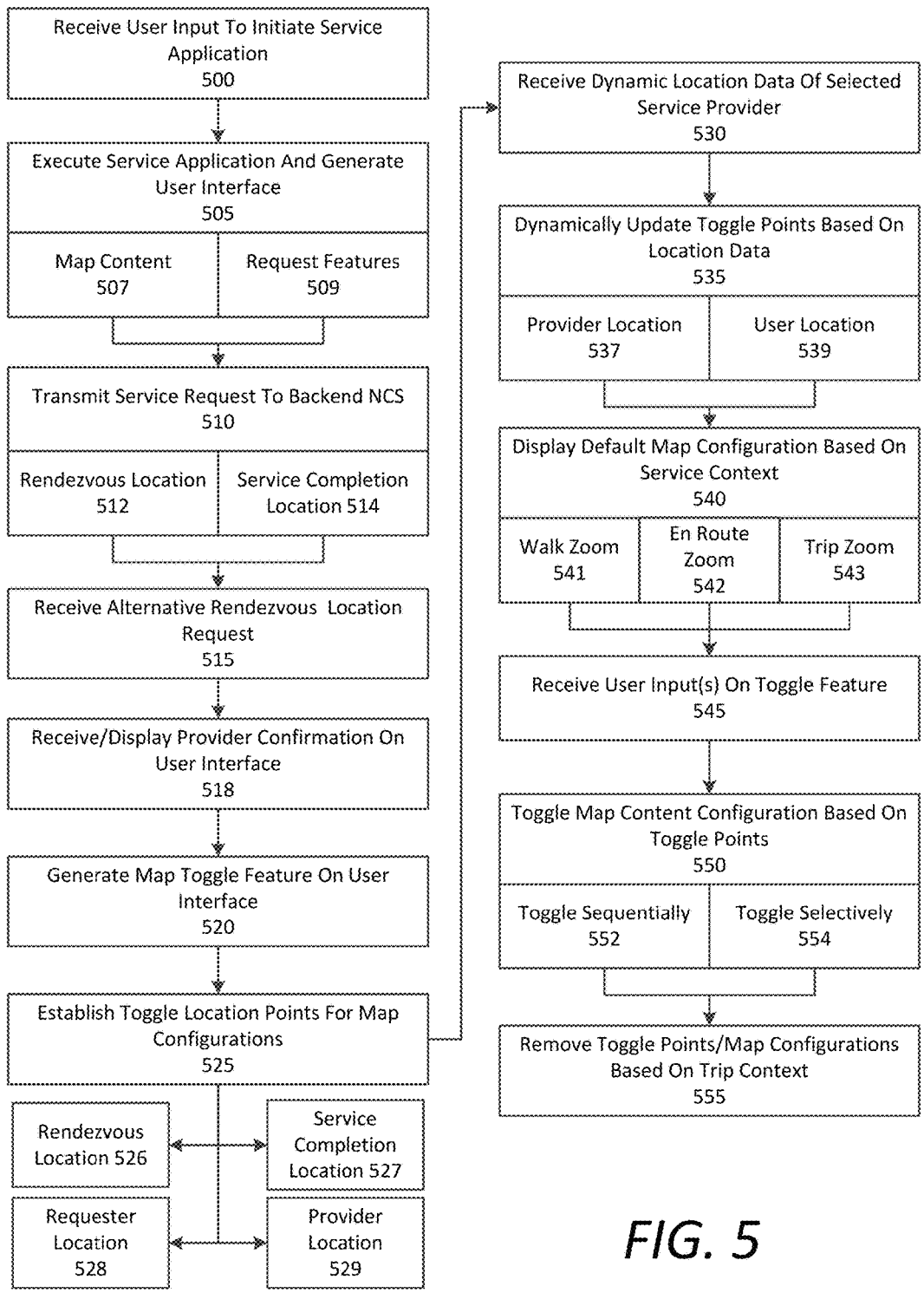
FIG. 5 is a flow chart describing an example method of toggling zoom for map content based on established location points, according to examples described herein.

FIG. 5 is a flow chart describing an example method of toggling zoom for map content based on established location points, according to examples described herein. In the below discussion of the FIG. 5, reference may be made to reference characters representing like features as shown and described with respect to FIGS. 1 through 4D. Furthermore, the processes described with respect to FIG. 5 may be performed by an example requester device 170, 200 executing a service application 175, 232, or a combination of the requester device 170, 200 and the network computer system 100, 290. Referring to FIG. 5, the requester device 200 can receive a user input 218 to initiate a service application 232 (500). In response to the user input 218, the requester device 200 can execute the service application 232 and generate a user interface 242 specific to the on-demand service (505). In various examples, execution of the service application 232 can also cause the requester device 200 to establish a communication link with the backend network computer system 290. As provided herein, the user interface 242 can comprise map content 223 (507) and request features (509) that enable the user to perform such functions as viewing service options (e.g., ride-pool, standard ride-share, large vehicle, luxury vehicle, professional driver, etc.), prices per service option, setting rendezvous locations and/or service completion locations, and submitting a service request 267 to the network computer system 290.

According to examples, once the requesting user 174 has selected a rendezvous location and/or service completion location, the requesting user 174 can select a request feature to cause the requester device 200 to transmit a service request 267 to the backend network computer system 290 (510). In certain implementations, the service request 267 can include an inputted or desired rendezvous location (512). Additionally or alternatively, the service request can include an inputted service completion location (514). Based on the service request 267, the network computer system 290 can determine an optimal service provider 189 to service the request 267 in light of any number of factors. In some examples, the network computer system 100 can send a request, suggestion, or instruction for the requesting user 174 to walk to an alternate rendezvous location, which can be received by the requester device 200 via the service application 232 (515). The requested or suggested alternative rendezvous location can be based on local rules or regulations (e.g., airport pick-up regulations mandating designated pick-up areas), or can be based on a convenience factor to optimize rendezvous time.

For example, due to road infrastructure with prevalent unidirectional traffic flows (e.g., in a downtown urban center), significant time may be saved by requesting that the requesting user 174 walk a block or two to more efficiently rendezvous with the service provider 189. In some aspects, the network computer system 100 can compare the ETAs between the requesting user's current location 173 and the locations 113 of a set of candidate service providers 184 with ETAs to various alternate rendezvous locations, and perform an optimization operation. This optimization operation can factor in an estimated walking time for the requesting user 174 to the alternate rendezvous location(s), which can be leveraged to ultimately save time and/or money. Thus, as an example, instead of a selected service provider 189 making additional turns and going through additional traffic lights, the requesting user 174 may simply walk a block to significantly reduce the service provider's ETA.

In some aspects, once a service provider 189 has been selected, the requester device 200 can receive and display a confirmation 269 that the service provider 189 is en route to the rendezvous location (518). According to examples described herein, the requester device 200 may then generate a map toggle feature 440 on the user interface 242 to enable the requesting user 174 to toggle between different map content configurations (520). The map content configurations can be established based on toggle points by either the requester device 200 or the backend network computer system 290. As provided herein, the map content configurations can be established based on toggle location points specific to the service request 267 (525). Such toggle location points can include the rendezvous location (526), the service completion location 484 (527), the requesting user's current location 173 (528), and the service provider's current location 113 (529). For example, the map content configurations can comprise static or dynamic zoom levels and centering based on one or more of the toggle location points.

In certain examples, local map configurations based on one toggle location point can be correlated to a static zoom level for the map content. For example, a local walk configuration 425 shown in FIG. 4B can be based on a single toggle location point (i.e., the requesting user's current location 173), and can have a persistent zoom level with map content that tracks or scrolls based on the requesting user's movement. Conversely, map configurations based on more than one toggle location point can be correlated to a dynamic zoom level that adjusts based on progress towards a particular location (e.g., the service provider's and requesting user's respective progress towards the rendezvous location). For example, the en route zoom screen 402 shown in FIG. 4A can be based on the service provider's current location 113, the requesting user's current location 173, and/or the rendezvous location, and can dynamically zoom and re-center based on the service provider's 189 and/or requesting user's 174 progress towards the rendezvous location.

In accordance with examples described herein, the user 174 can utilize the zoom toggle feature 440 to toggle between the established map configurations, which themselves can be dynamically updated. In certain implementations, the requester device 200 can receive dynamic location data of the selected service provider 189 (530), and can dynamically update the toggle points (535) based on location data of both the user 174 (539) and the service provider 189 (537). In some aspects, the requester device 200 can display a default map configuration based on the current context of the service (540). For example, if the requesting user 174 needs to walk to the rendezvous location, the service application 232 can display a local walk map configuration 425 to provide the requesting user 174 with detailed walking directions to the rendezvous location (541). As another example, if the requesting user 174 has reached the rendezvous location but the service provider is still en route, the service application 232 can display the en route configuration 402 by default to show the service provider's progress to the rendezvous location (542). As yet another example, if the service provider 189 has picked up the requesting user 174 and the pair are en route to the destination, the service application 232 can display a trip configuration 480 by default to show the overall travel progress to the service completion location 484 (543).

At any given time, the requester device 200 can receive a user input 218 on the map toggle feature 440 displayed on the map content 409 (545). In response to each input 218, the service application 232 can toggle through the map content configurations based on the established toggle points (550). In certain examples, the service application 232 can toggle through each of the map content configurations sequentially with each respective user input 218 on the zoom toggle feature 440 (552). In variations, the map toggle feature 440 can include a list or dedicated icons indicating each of the map configurations, the service application 232 can selectively toggle between the configurations (554) based on user selections.

Furthermore, based on the trip context, the service application 232 can remove toggle location points and/or map configurations (555). For example, once the requesting user 174 reaches the rendezvous location, the walk configurations (i.e., the local walk configuration 425 and the full walk configuration 460) become obsolete, so the service application 232 can remove them from the sequential set of mapping configurations. Thereafter, user input 218 on the toggle feature 440 can cause the service application 232 to toggle between the remaining mapping configurations, such as the en route configuration 402 and the trip configuration 480.

Figure 6:
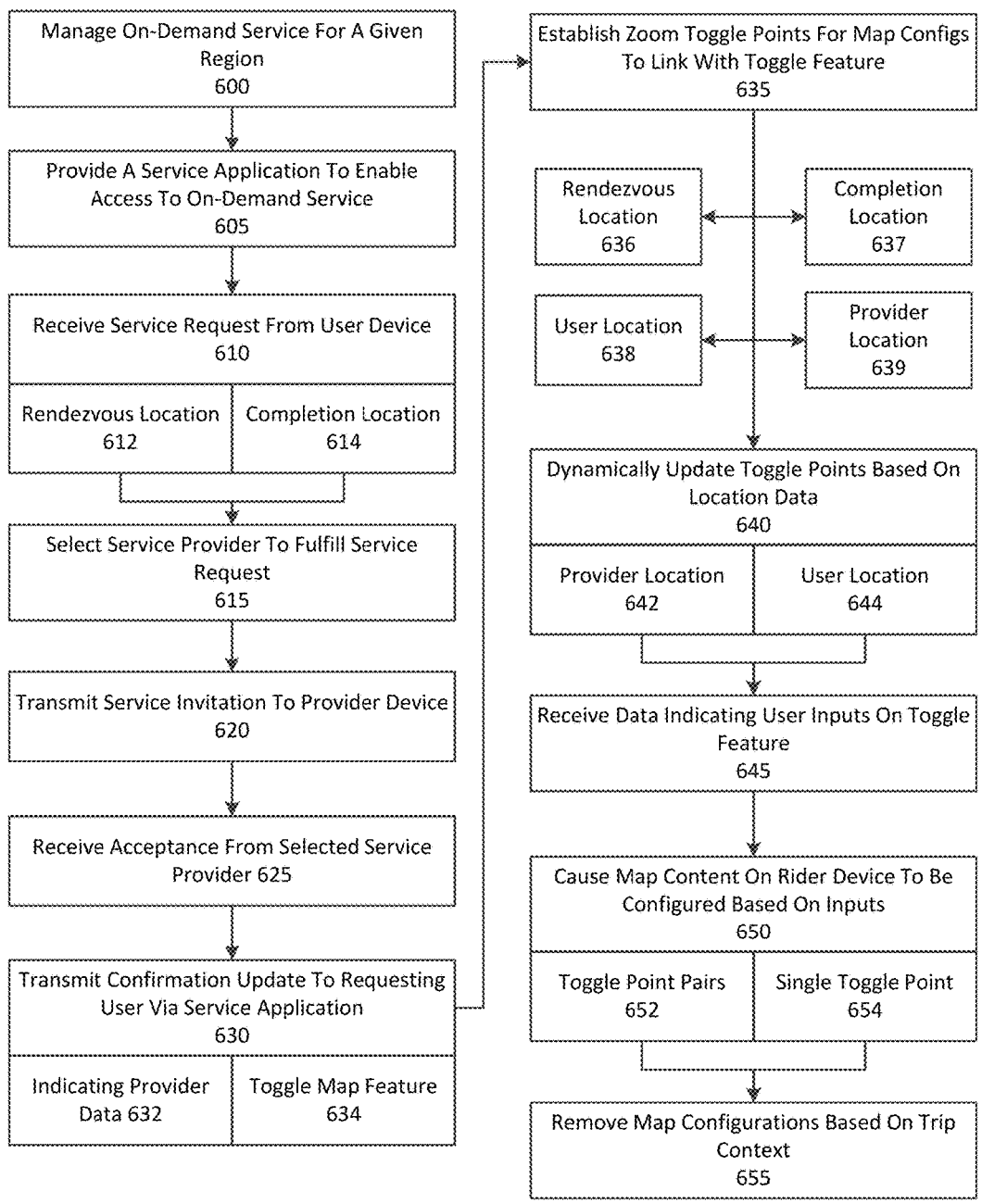
FIG. 6 is another flow chart describing an example method of toggling zoom for map content based on established location points, according to examples described herein.

FIG. 6 is another flow chart describing an example method of toggling zoom for map content based on established location points, according to examples described herein. The below processes described with respect to FIG. 6 may be performed by an example network computer system 100, 290 shown and described with respect to FIGS. 1 and 2, or a combination of the network computer system 100, 290 and the requester device 170, 200 of FIGS. 1 and 2. Referring to FIG. 6, the network computer system 100 can manage an on-demand service that connects requesting users 174 with available service providers 184 throughout a give region (600). In doing so, the network computer system 100 can provide a service application 175 to requesting users 174—for execution on the users' computing devices 170—to enable the requesting users 174 to access the on-demand service (605). The network computer system 100 can receive service requests 171 from the user devices 170 via the service application 175 (610). In various implementations, the service requests 171 can include a rendezvous location (612) and/or a service completion location (614).

Based on the rendezvous location, the network computer system 100 can select a service provider 189 to fulfill or complete the service request 171 (615). Once the service provider 189 is selected, the network computer system 100 can transmit a service invitation 132 to the service provider device 180 via the service provider application 185 (620). In response, the network computer system 100 can receive an acceptance 181 from the service provider device 180 of the selected service provider 189 (625), and transmit a confirmation 134 of the service to the requesting user 174 (630). In various examples, the confirmation 134 can include service provider data 632 indicating identifying information of the service provider 189, such as a vehicle type, color, license plate number, the service provider's name, etc. (632). In further examples, a content engine 120 of the network computer system 100 can provide map content with a plurality of map configurations, and a map toggle feature 440 to enable the requesting user 174 to toggle between the different configurations (634).

In generating the map content for the user interface 152 of the service application 175, the network computer system 100 can establish toggle points for the different map configurations to link with the map toggle feature 440, as described above (635). The toggle points can comprise the rendezvous location (636), the destination (637), the user's current location 173 (638), and the service provider's current location 113 (639). Furthermore, the network computer system 100 can monitor or track the toggle points to cause the map configurations to dynamically update on the service application 175 (640). For example, the network computer system 100 can monitor the locations of the requesting user 174 (644) and the service provider 189 (642) as they progress to the rendezvous location, and dynamically update their locations on the map content 409 displayed on the requester device 170. By updating the toggle point locations, the network computer system 100 can dynamically alter the manner in which the map configurations are displayed on the requester device 170. For example, the zoom level and/or centering of the map content 409 can be dynamically updated for each map configuration based on the dynamic nature of the toggle point locations.

The network computer system 100 can receive data indicating user inputs 218 on the map toggle feature 440 (645). Based on the user inputs 218, the network computer system 100 can cause the map content 409 on the requester device 170 to be configured according to the respective toggle points associated with that mapping configuration (650). As described above, each of the toggled map configurations can be based on toggle point pairs (e.g., the en route zoom screen 402), or a single toggle point (e.g., the local walk zoom screen 425 (654). Furthermore, the network computer system 100 can configure the parameters of the map configurations based on the number of toggle points. For example, the network computer system 100 can configure map configurations having two or more zoom toggle points to update a zoom level dynamically as the respective locations are updated. As another example, the network computer system 100 can configure map configurations having a single toggle point to update a centering position dynamically based on the changing location of the single toggle point.

In one example, prior to pick-up, the requesting user 174 can toggle between a walk zoom and an en route zoom, wherein the walk zoom includes the requesting user's current location 173 and the rendezvous location as zoom toggle points, and the en route zoom has the service provider's current location 113 and the rendezvous location or requesting user's current location 173 as zoom toggle points. In this particular example, the requesting user 174 can utilize the toggle feature 440 to pivot the map content 409 between the two configurations as the requesting user 174 proceeds to the rendezvous location. Furthermore, each of the two configurations can be dynamically updated based on the changing locations of the both the requesting user 174 and the service provider 189. According to examples described herein, utilizing the zoom toggle feature 440, the requesting user 174 can toggle between each of the established map configurations at any given time over the course of a trip. Still further, once certain map configurations become obsolete (e.g., in the event of a convergence between multiple toggle points), the network computer system 100 can remove the corresponding map configurations (655).

Hardware Diagram

Figure 7:
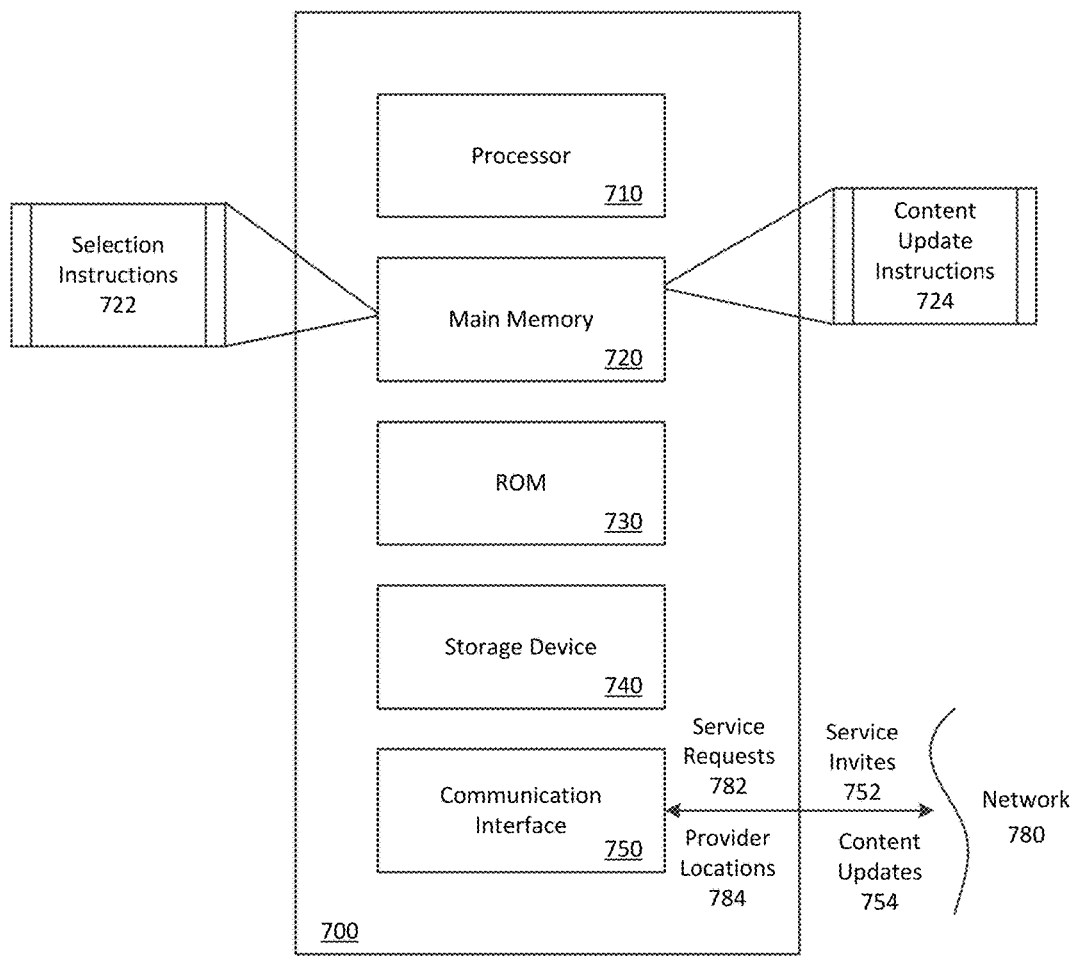
FIG. 7 is a block diagram illustrating a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing on-demand services, such as an on-demand transportation service. In the context of FIG. 1, the network computer system 700 may be implemented using a computer system 700 such as described by FIG. 7. The network computer system 100 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, and/or one or more self-driving vehicles. In accordance with examples, the computer system 700 receives service requests 782 from mobile computing devices of individual users. The executable instructions stored in the memory 730 can include selection instructions 722, which the processor 710 executes to select an optimal service provider to fulfill the service request 782. In doing so, the computer system can receive service provider locations 784 of service providers operating throughout the given region, and the processor can execute the selection instructions 722 to select an optimal service provider from a set of available service providers, and transmit a service invitation 752 to enable the service provider to accept or decline the service offer.

The executable instructions stored in the memory 720 can also include content update instructions 724, which enable the computer system 700 to respond to user inputs on a service application executing on the requesting user's mobile computing device with content updates 754. As provided herein, the content updates 754 can include map configuration updates based on changing zoom toggle points for map content. These zoom toggle points can comprise the requesting user's current location, the service provider's current location, the rendezvous location, and the service completion location. Execution of the content update instructions 724 can cause the processor 710 to establish map configurations (e.g., centering and zoom) utilizing single or multiple zoom toggle points.

By way of example, the instructions and data stored in the memory 720 can be executed by the processor 710 to implement an example network computer system 100 of FIG. 1. In performing the operations, the processor 710 can receive service requests 782 and service provider locations 784, and submit service invitations 752 to facilitate the fulfillment of the service requests 782. Furthermore, in response to user selections on a zoom toggle feature on the requesting user's computing device, execution of the content update instructions 724 can cause the processor 710 to provide content updates 754 comprising sequential map configurations established using the zoom toggle points.

The processor 710 is configured with software and/or other logic to perform one or more processes, steps and other functions described with implementations, such as described by FIGS. 1-6, and elsewhere in the present application.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A non-transitory computer readable medium storing instructions that, when executed by one or more processors of a computing device, cause the computing device to:
   receive data corresponding to a dynamic location of a transport service provider traveling to rendezvous with a requesting user at a start location;
   generate map content to be displayed on a user interface of the computing device; and
   generate a toggle feature on the user interface to enable the requesting user to switch between a plurality of map configurations for the map content, each of the plurality of map configurations comprising a dynamic zoom level of the map content, the dynamic zoom level being defined by a plurality of toggle points comprising a plurality of (i) the dynamic location of the transport service provider, (ii) a dynamic location of the requesting user, or (iii) the start location;
   wherein the plurality of map configurations comprises a first dynamic zoom level for a walk configuration, and wherein the plurality of toggle points for the first dynamic zoom level comprises the dynamic location of the requesting user and the start location; and
   wherein the plurality of map configurations comprises a second dynamic zoom level for an en route configuration, and wherein the plurality of toggle points for the second dynamic zoom level comprises the dynamic location of the transport service provider and the dynamic location of the requesting user.

2. The non-transitory computer readable medium of claim 1, wherein the executed instructions further cause the computing device to:
   cause dynamic zooming of the map content on the user interface based at least in part on the dynamic location of the transport service provider.

3. The non-transitory computer readable medium of claim 2, wherein the executed instructions further cause the computing device to cause dynamic zooming of the map content on the user interface based on the dynamic location of the requesting user.

4. The non-transitory computer readable medium of claim 2, wherein the executed instructions further cause the computing device to cause dynamic zooming of the map content on the user interface based on the start location.

5. The non-transitory computer readable medium of claim 1, wherein the executed instructions further cause the computing device to:
   when the map content is in the walk configuration, provide, on the user interface, an estimated walk time to the start location for the requesting user.

6. The non-transitory computer readable medium of claim 1, wherein sequential inputs on the toggle feature cause the computing device to toggle between the first dynamic zoom level and the second dynamic zoom level.

7. The non-transitory computer readable medium of claim 1, wherein the executed instructions further cause the computing device to:
when the map content is in the en route configuration, provide, on the user interface, an estimated time of arrival for the transport service provider to arrive at the start location.

8. A computer-implemented method of generating map content, the method being performed by one or more processors of a computing device and comprising:
receiving data corresponding to a dynamic location of a transport service provider traveling to rendezvous with a requesting user at a start location;
generating map content to be displayed on a user interface of the computing device; and
generating a toggle feature on the user interface to enable the requesting user to switch between a plurality of map configurations for the map content, each of the plurality of map configurations comprising a dynamic zoom level of the map content, the dynamic zoom level being defined by a plurality of toggle points comprising a plurality of (i) the dynamic location of the transport service provider, (ii) a dynamic location of the requesting user, or (iii) the start location;
wherein the plurality of map configurations comprises a first dynamic zoom level for a walk configuration, and wherein the plurality of toggle points for the first dynamic zoom level comprises the dynamic location of the requesting user and the start location; and
wherein the plurality of map configurations comprises a second dynamic zoom level for an en route configuration, and wherein the plurality of toggle points for the second dynamic zoom level comprises the dynamic location of the transport service provider and the dynamic location of the requesting user.

9. The method of claim 8, further comprising:
causing dynamic zooming of the map content on the user interface based at least in part on the dynamic location of the transport service provider.

10. The method of claim 9, wherein the one or more processors cause dynamic zooming of the map content on the user interface based on the dynamic location of the requesting user.

11. The method of claim 9, wherein the one or more processors cause dynamic zooming of the map content on the user interface based on the start location.

12. The method of claim 8, further comprising:
when the map content is in the walk configuration, providing, on the user interface, an estimated walk time to the start location for the requesting user.

13. The method of claim 8, wherein sequential inputs on the toggle feature cause the one or more processors to toggle between the first dynamic zoom level and the second dynamic zoom level.

14. The method of claim 8, further comprising:
when the map content is in the en route configuration, providing, on the user interface, an estimated time of arrival for the transport service provider to arrive at the start location.

15. The method of claim 8, further comprising:
in the walk configuration, providing walking directions on the map content to enable the requesting user to travel to the start location.

16. A computing device comprising
one or more processors; and
a memory storing instructions that, when executed by the one or more processors, cause the computing device to:
receive data corresponding to a dynamic location of a transport service provider traveling to rendezvous with a requesting user at a start location;
generate map content to be displayed on a user interface of the computing device; and
generate a toggle feature on the user interface to enable the requesting user to switch between a plurality of map configurations for the map content, each of the plurality of map configurations comprising a dynamic zoom level of the map content, the dynamic zoom level being defined by a plurality of toggle points comprising a plurality of (i) the dynamic location of the transport service provider, (ii) a dynamic location of the requesting user, or (iii) the start location;
wherein the plurality of map configurations comprises a first dynamic zoom level for a walk configuration, and wherein the plurality of toggle points for the first dynamic zoom level comprises the dynamic location of the requesting user and the start location; and
wherein the plurality of map configurations comprises a second dynamic zoom level for an en route configuration, and wherein the plurality of toggle points for the second dynamic zoom level comprises the dynamic location of the transport service provider and the dynamic location of the requesting user.

* * * * *